US011711722B2

(12) United States Patent
Volkerink et al.

(10) Patent No.: US 11,711,722 B2
(45) Date of Patent: Jul. 25, 2023

(54) DETECTING AIRWAVE CONGESTION AND USING VARIABLE HANDSHAKING GRANULARITIES TO REDUCE AIRWAVE CONGESTION

(71) Applicant: Trackonomy Systems, Inc., San Jose, CA (US)

(72) Inventors: Hendrik J Volkerink, Palo Alto, CA (US); Ajay Khoche, West San Jose, CA (US)

( * ) Notice: Subject to any disclaimer, the term of this patent is extended or adjusted under 35 U.S.C. 154(b) by 0 days.

(21) Appl. No.: 17/493,839

(22) Filed: Oct. 4, 2021

(65) Prior Publication Data

US 2022/0095157 A1  Mar. 24, 2022

Related U.S. Application Data

(63) Continuation-in-part of application No. 17/300,341, filed on May 14, 2021.

(60) Provisional application No. 63/087,546, filed on Oct. 5, 2020, provisional application No. 63/087,320, filed on Oct. 5, 2020, provisional application No. 63/087,278, filed on Oct. 4, 2020, provisional application No. 63/025,165, filed on May 14, 2020.

(51) Int. Cl.
| | | |
|---|---|---|
| *H04L 1/00* | (2006.01) | |
| *H04W 28/02* | (2009.01) | |
| *H04W 40/24* | (2009.01) | |
| *H04W 24/10* | (2009.01) | |
| *H04W 88/16* | (2009.01) | |
| *H04W 84/18* | (2009.01) | |

(52) U.S. Cl.
CPC ....... *H04W 28/0289* (2013.01); *H04W 24/10* (2013.01); *H04W 28/0284* (2013.01); *H04W 40/246* (2013.01); *H04W 84/18* (2013.01); *H04W 88/16* (2013.01)

(58) Field of Classification Search
CPC ............. H04W 28/0289; H04W 24/10; H04W 28/0284; H04W 40/246; H04W 84/18
See application file for complete search history.

(56) References Cited

U.S. PATENT DOCUMENTS

| | | |
|---|---|---|
| 6,614,392 B2 | 9/2003 | Howard |
| 7,797,367 B1 | 9/2010 | Gelvin et al. |

(Continued)

FOREIGN PATENT DOCUMENTS

| | | |
|---|---|---|
| AU | 2018250358 A1 | 5/2019 |
| CA | 3061878 A1 | 11/2018 |

OTHER PUBLICATIONS

U.S. Appl. No. 10/123,294, filed Nov. 6, 2018, Thompson et al..

(Continued)

*Primary Examiner* — Joseph J Lauture

(57) ABSTRACT

A wireless sensing system includes a gateway node configured to wirelessly communicate with a plurality wireless nodes in an environment, and a first set of the plurality of wireless nodes, each wireless node of the first set configured to wirelessly communicate with the gateway node and to wirelessly communicate with other wireless nodes of the plurality of wireless nodes, each wireless node of the first set comprising a same first group identifier. The gateway node is configured to address the first set of the plurality of the wireless nodes by addressing all wireless nodes in the environment that broadcast the first group identifier.

20 Claims, 15 Drawing Sheets

(56) References Cited

U.S. PATENT DOCUMENTS

| | | |
|---|---|---|
| 9,565,622 B2 | 2/2017 | Chikkappa et al. |
| 9,773,220 B2 | 9/2017 | Blanchard et al. |
| 9,794,753 B1 | 10/2017 | Stitt et al. |
| 2005/0063313 A1 | 3/2005 | Nanavati et al. |
| 2007/0049291 A1 | 3/2007 | Kim et al. |
| 2009/0290511 A1 | 11/2009 | Budampati et al. |
| 2010/0082870 A1 | 4/2010 | Tokuhara |
| 2011/0035491 A1 | 2/2011 | Gelvin et al. |
| 2012/0147868 A1* | 6/2012 | Williams ............ H04W 4/38 370/338 |
| 2013/0002044 A1 | 1/2013 | Takehara et al. |
| 2013/0070636 A1 | 3/2013 | Farley et al. |
| 2013/0272180 A1 | 10/2013 | Hiremath et al. |
| 2015/0180971 A1 | 6/2015 | Varney et al. |
| 2015/0249482 A1 | 9/2015 | Czaja |
| 2015/0349917 A1 | 12/2015 | Skaaksrud |
| 2016/0233927 A1 | 8/2016 | Wu |
| 2017/0238035 A1 | 8/2017 | Perez |
| 2017/0280351 A1 | 9/2017 | Skaaksrud |
| 2018/0084371 A1 | 3/2018 | Scagnol et al. |
| 2018/0139726 A1 | 5/2018 | Choi et al. |
| 2018/0165568 A1 | 6/2018 | Khoche |
| 2018/0279179 A1 | 9/2018 | Norlén et al. |
| 2018/0293513 A1 | 10/2018 | Sugaya |
| 2018/0321356 A1 | 11/2018 | Kulkarni et al. |
| 2018/0365635 A1 | 12/2018 | Lucrecio et al. |
| 2019/0113632 A1 | 4/2019 | Lucrecio et al. |
| 2019/0116091 A1 | 4/2019 | Bijavara Aswathanarayana Rao et al. |
| 2019/0138534 A1 | 5/2019 | Bernat et al. |
| 2019/0158606 A1 | 5/2019 | Guim Bernat et al. |
| 2019/0222055 A1 | 7/2019 | Khoche et al. |
| 2019/0285724 A1 | 9/2019 | Skaaksrud |
| 2019/0362215 A1 | 11/2019 | Khoche |
| 2019/0370624 A1 | 12/2019 | Khoche |
| 2021/0084457 A1 | 3/2021 | Volkerink et al. |

OTHER PUBLICATIONS

U.S. Appl. No. 10/313,925, filed Jun. 4, 2019, Jones et al..
U.S. Appl. No. 10/379,842, filed Aug. 13, 2019, Malladi et al..
U.S. Appl. No. 10/595,274, filed Mar. 17, 2020, Khaled et al..
U.S. Appl. No. 11/003,978, filed May 11, 2021, Khoche.
PCT International Search Report, International Application No. PCT/US 20/50728. International search completed Nov. 5, 2020. International Search Report dated Dec. 16, 2020. pp. 1-2.
Luo et al "Self-securing Ad Hoc Wireless Networks." Proceedings of the Seventh International Symposium on Somputers and Communications (ISCC'02). 1530-1346/02, 2002, IEEE Computer Society.
Pagani et al. "Resource sharing between neighboring nodes in heterogeneous Wireless Sensor Networks." 2015 European Conference on Networks and Communications (EuCNC). Conference dates Jun. 29 to Jul. 2, 2015.
Lucrecio et al. "Systems and Methods for Hybrid Cloud-Edge Computing Method For okutomated Decision Making and Probabilistic Occurrence." U.S. Appl. No. 32/520,348, filed Jun. 15, 2017. Expired.
International Patent Application No. PCT/US2021/038140, International Search Report and Written Opinion dated Nov. 8, 2021, 11 pages.
Hassan et al. "A Design of Packages Tracking System Based on Radio Frequency Identification" IEEE 2018.

* cited by examiner

DETECTING AIRWAVE CONGESTION AND USING VARIABLE HANDSHAKING GRANULARITIES TO REDUCE AIRWAVE CONGESTION

CROSS-REFERENCE TO RELATED APPLICATIONS

This application is a continuation-in-part of U.S. patent application Ser. No. 17/300,341, filed on May 14, 2021, which claims priority to U.S. Provisional Patent Application No. 63/025,165, filed on May 14, 2020, each of which is incorporated herein in its entirety. This application also claims priority to U.S. Provisional Patent Application No. 63/087,278, filed on Oct. 4, 2020, to U.S. Patent Application 63/087,320, filed on Oct. 5, 2020, and to U.S. Provisional Patent Application No. 63/087,546, filed on Oct. 5, 2020, each of which is incorporated herein in its entirety.

FIELD OF THE DISCLOSURE

This disclosure generally relates to wireless internet of things (IOT) devices and networks.

BACKGROUND

In systems having a large number of wireless nodes, open communications between the nodes can often cause airwave congestion, long latencies, and battery life concerns. When airwave congestion occurs in systems, it is necessary to identify and address congestion quickly in order to prevent gridlock from occurring within the system. While handshaking may be used to establish specific communications channels, individual handshaking between nodes still requires a large amount of time and power as the number of nodes increases in a system.

SUMMARY

A wireless sensing system includes a gateway node configured to wirelessly communicate with a plurality wireless nodes in an environment, and a first set of the plurality of wireless nodes, each wireless node of the first set configured to wirelessly communicate with the gateway node and to wirelessly communicate with other wireless nodes of the plurality of wireless nodes, each wireless node of the first set comprising a same first group identifier. The gateway node is configured to address the first set of the plurality of the wireless nodes by addressing all wireless nodes in the environment that broadcast the first group identifier.

In an aspect, a wireless sensing system detects airwave congestion using one or more methods and performs one or more actions to reduce congestion and prevent gridlock. Methods for detecting airwave congestion may include one or more of: Receiving information describing time of nodes and measured latencies for nodes of the system; checking for cyclic redundancy check (CRC) failures as a proxy for airwave congestion; measuring and analyzing usage of resources and communications within the system; and identifying and circumventing heartbeat signals. In some embodiments, additional or different methods may be used to detect airwave congestion, and combinations of methods may be used in parallel, simultaneously, or sequentially.

Responsive to the wireless sensing system detecting airwave congestion, the wireless sensing system determines one or more actions for preventing gridlock and reducing airwave congestion. For example, the wireless sensing system may reduce communication frequencies, may increase lossy compression for transmitting communications or data, may instruct one or more nodes to enter modes requiring less communications (e.g., a hibernation or sleep mode, a low communications mode), or may transmit a busy signal to nodes of the wireless sensing system.

In an embodiment, the wireless sensing system includes a plurality of nodes configured to execute one or more handshaking protocols at a group granularity. Nodes of the wireless sensing system are associated with a group identifier. Each group of nodes communicates with an infrastructure of the wireless sensing system via a handshaking protocol. Additional communications may be transmitted within each group of nodes, such that instructions, data, and other information may be received by any node of the wireless sensing system.

In an embodiment, group identifiers are assigned to nodes based on a media access control (MAC) address associated with nodes of the wireless sensing system. For example, nodes having MAC addresses ending in a first particular value or first set of values may be assigned to a first group, while nodes having MAC addresses ending in a second particular value or second set of values may be assigned to a second group, and so forth. In another embodiment, group identifiers are assigned to nodes based on communication capabilities, sensors, functions, locations, or other elements of the nodes.

In an embodiment, nodes of the wireless sensing system self-identify group identifiers and self-organize into groups of nodes. For example, each node of the wireless sensing system identifies a corresponding MAC address and identifies a corresponding group identifier based on the MAC address. In another embodiment, an infrastructure of the wireless sensing system identifies and organizes nodes into groups of nodes.

The infrastructure of the wireless sensing system selectively communicates groups of nodes to transmit and receive data, instructions, and other information. For example, the infrastructure may confirm receipt of a communication from a node of a group of nodes, transmit an instruction for a node or group of nodes to enter a sleep mode, transmit an instruction for a node or a group of nodes to execute an action, perform a computation, or capture sensor data, and the like. In an example, the infrastructure confirms receipt of a communications (e.g., a handshaking protocol) from one or more nodes of a group of nodes, wherein the one or more nodes does not include at least one node of the group of nodes. The one or more nodes having been confirmed as completing the handshaking protocol may enter a sleep mode. The at least one node not having been confirmed as completing the handshaking protocol transmits an additional communication to the infrastructure to execute the handshaking protocol.

In an embodiment, responsive to the infrastructure confirming the handshaking protocol as having been completed by all nodes in a group of nodes, each node of the group of nodes is configured to enter a sleep mode. In an embodiment, each node of the group of nodes is further configured to wake up responsive to an event, e.g., an additional communication from the infrastructure or a signal transmitted by another entity of the wireless sensing system.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Figure 1A:
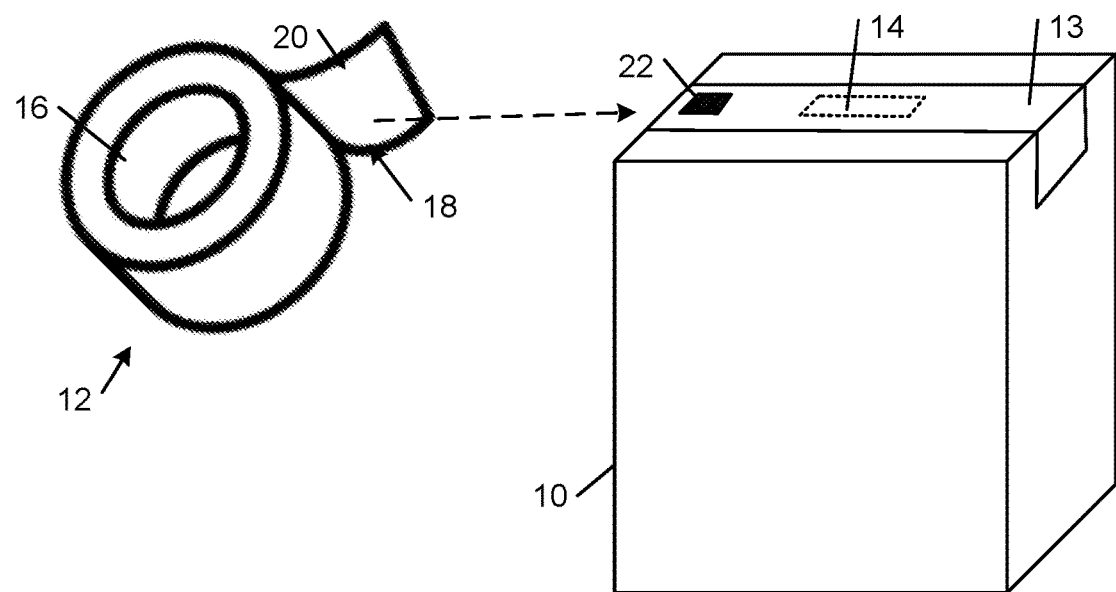
FIG. 1A is a diagrammatic view of an asset that has been sealed for shipment using a segment of an example adhesive tape platform dispensed from a roll, according to some embodiments.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

Introduction

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
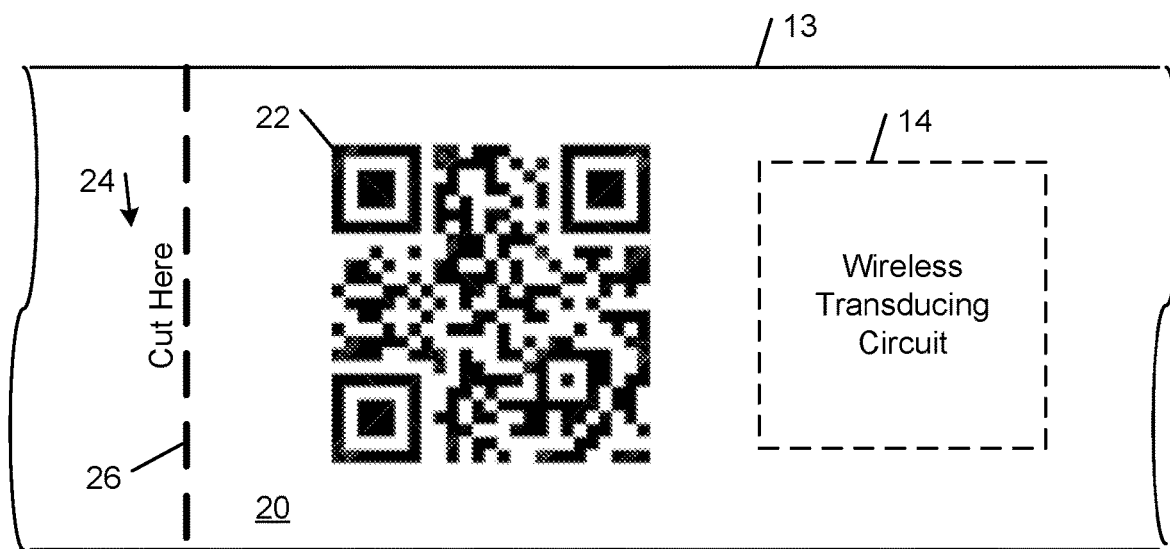
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
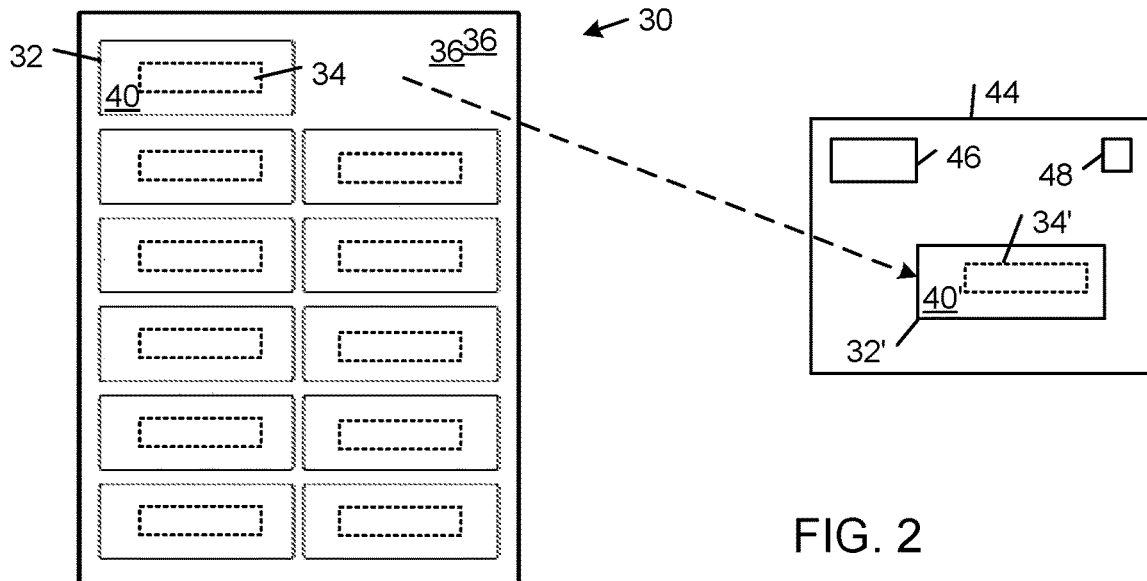
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
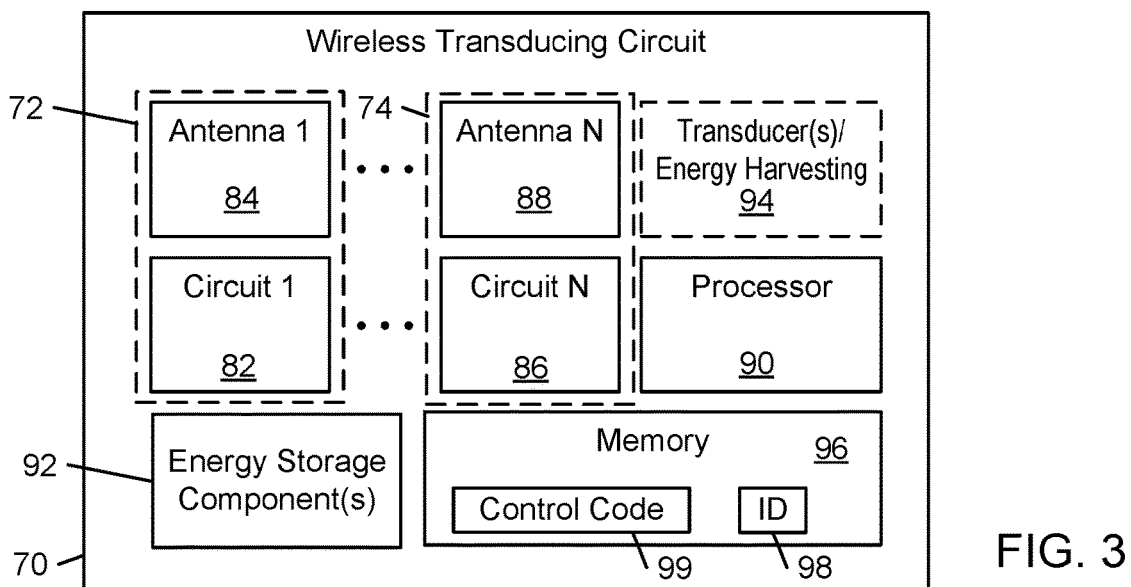
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
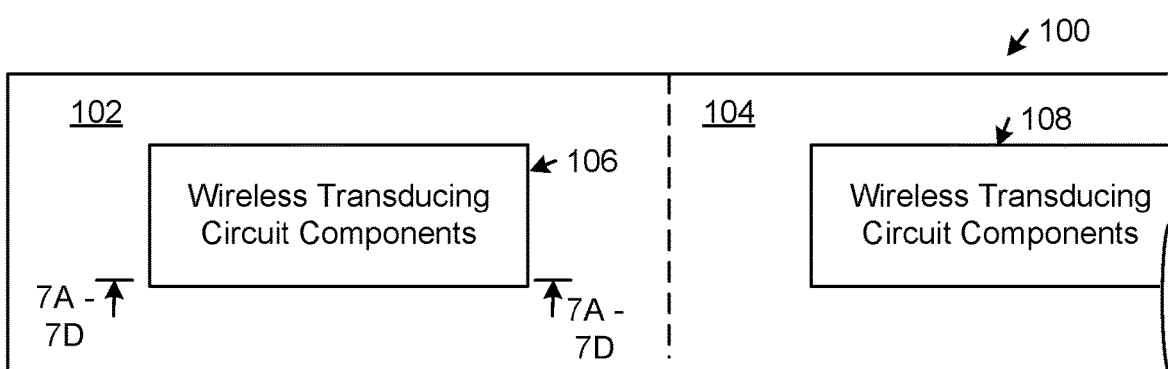
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
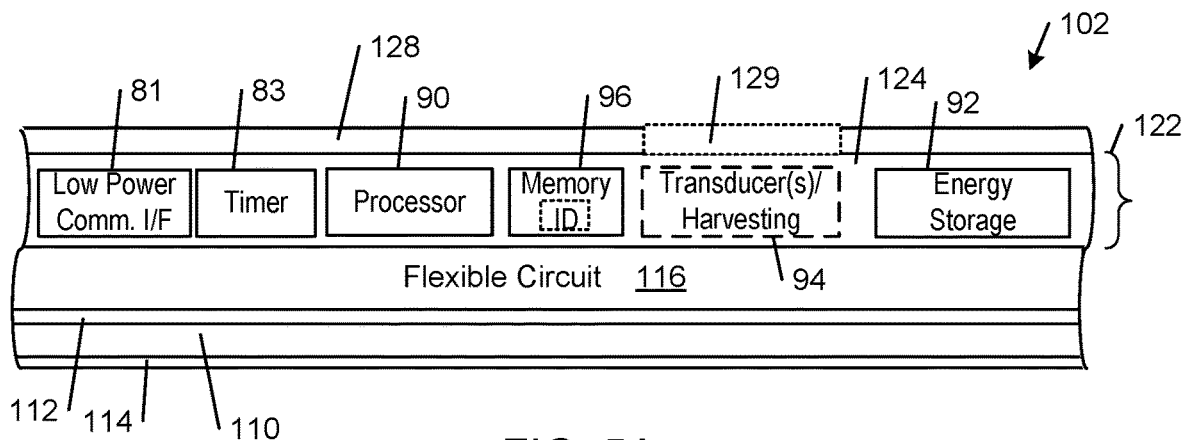
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
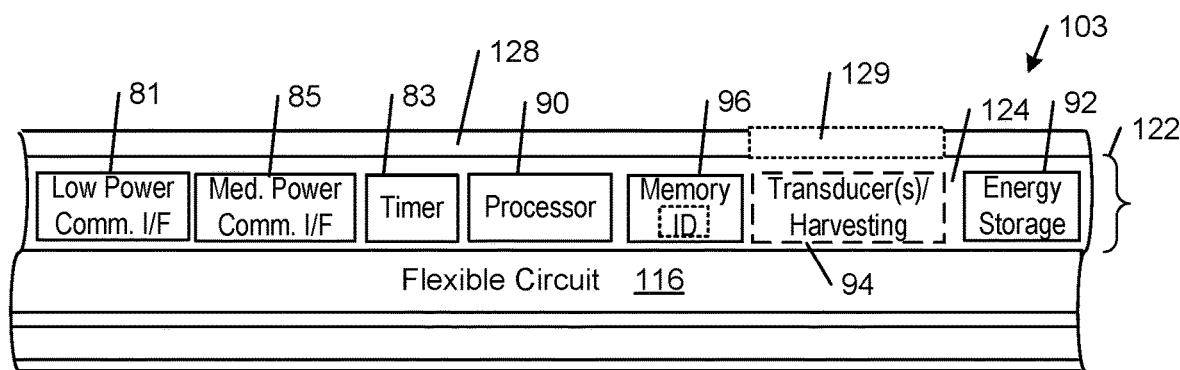

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
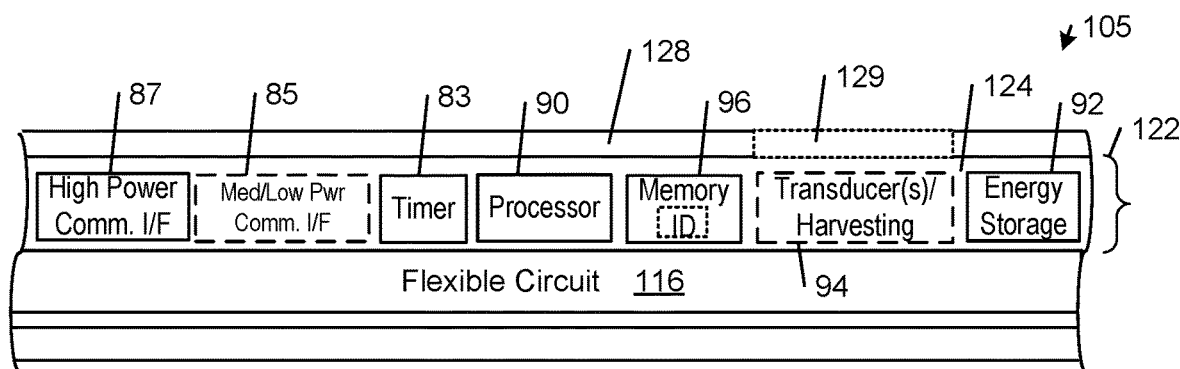

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
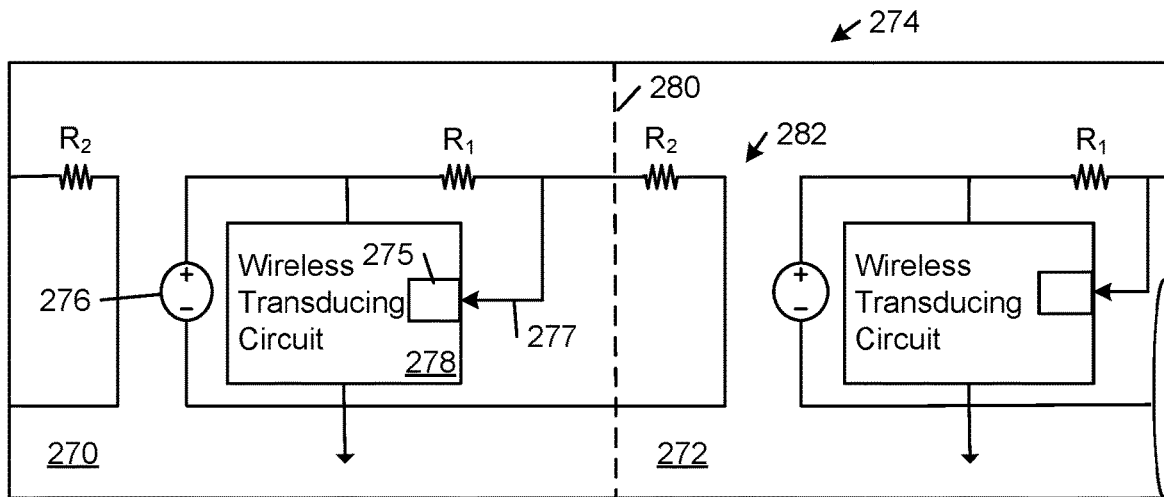
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
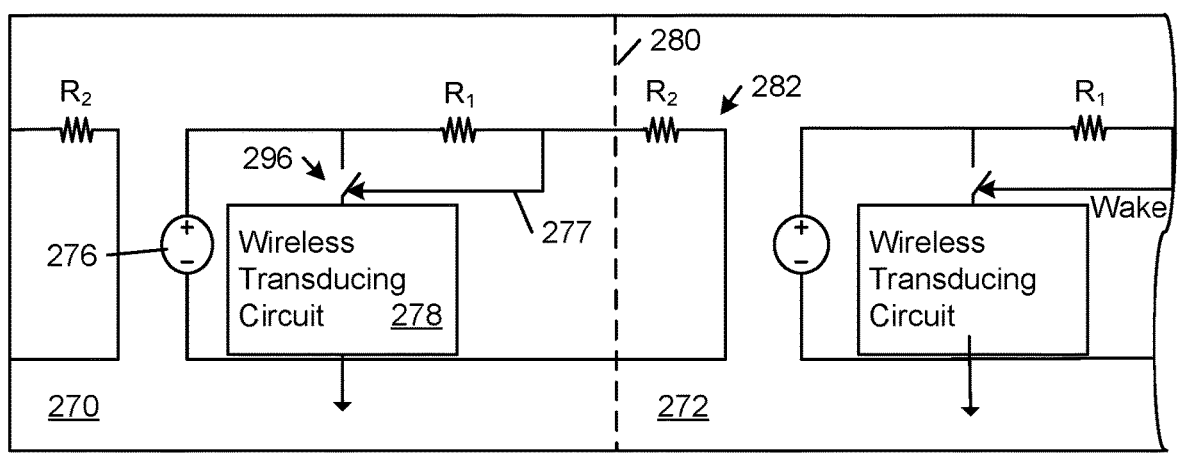

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
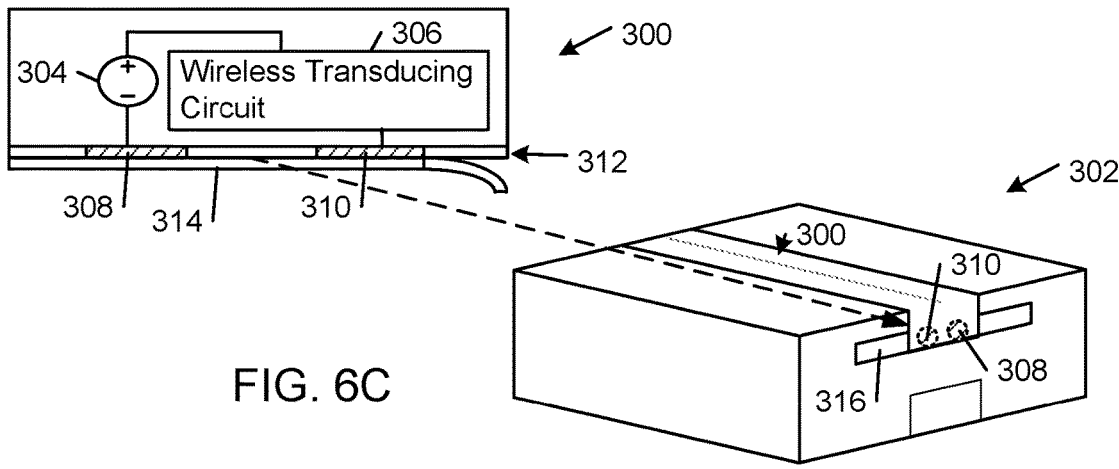
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
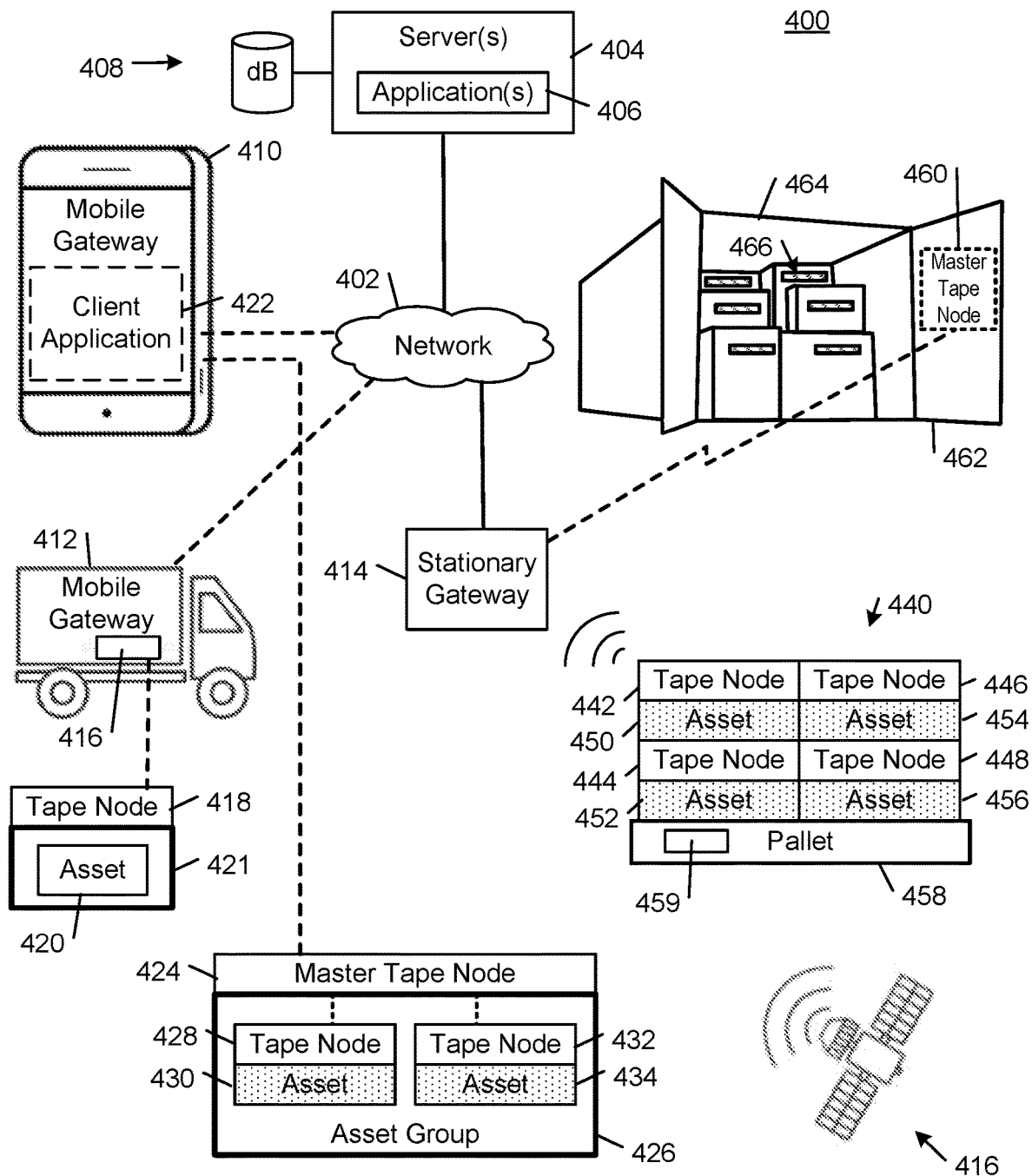
FIG. 7 is a diagrammatic view of an example of a network environment supporting communications with segments of an adhesive tape platform, according to some embodiments.

FIG. 7 shows an example network communications environment 400 (also referred to herein as an "IOT system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
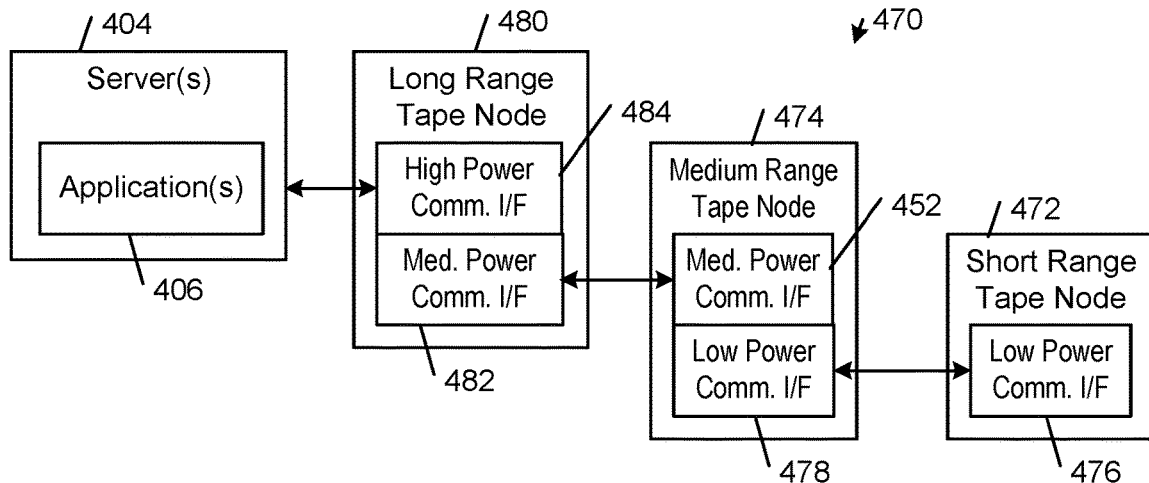
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
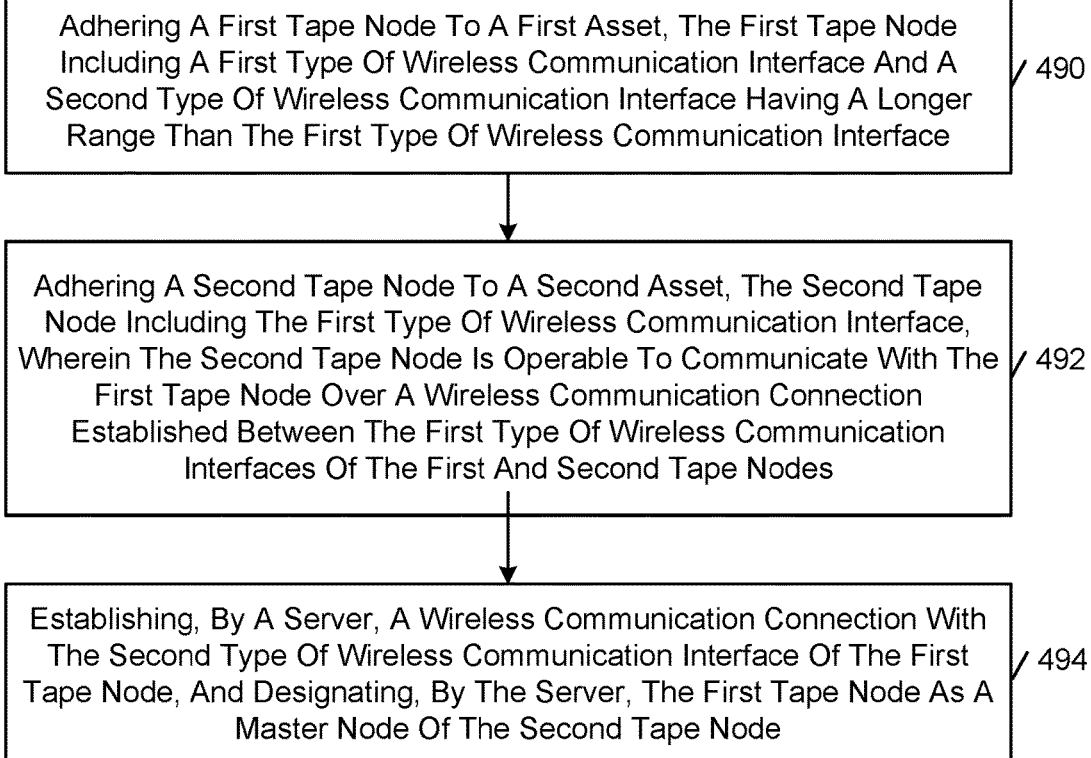
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events.

In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
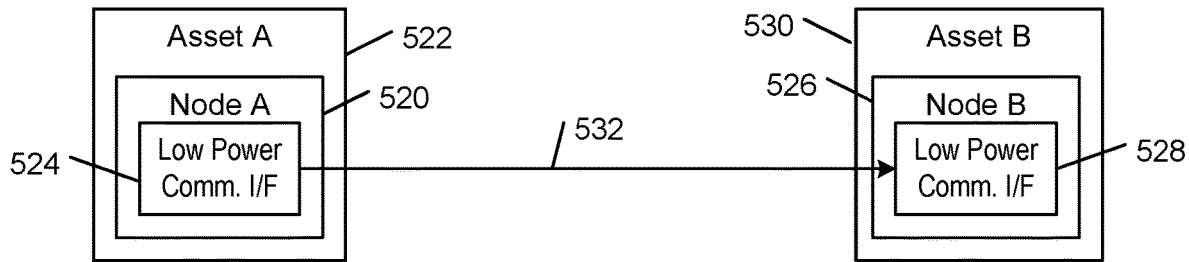
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
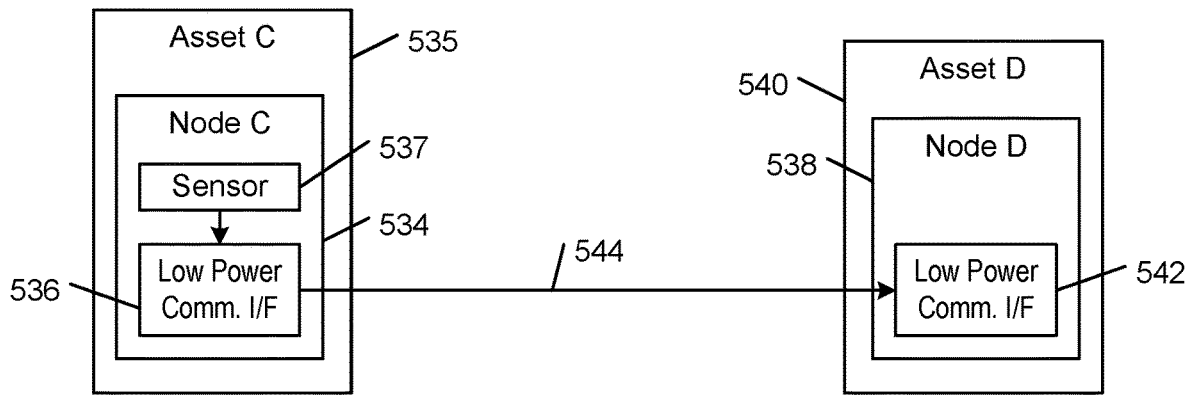

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
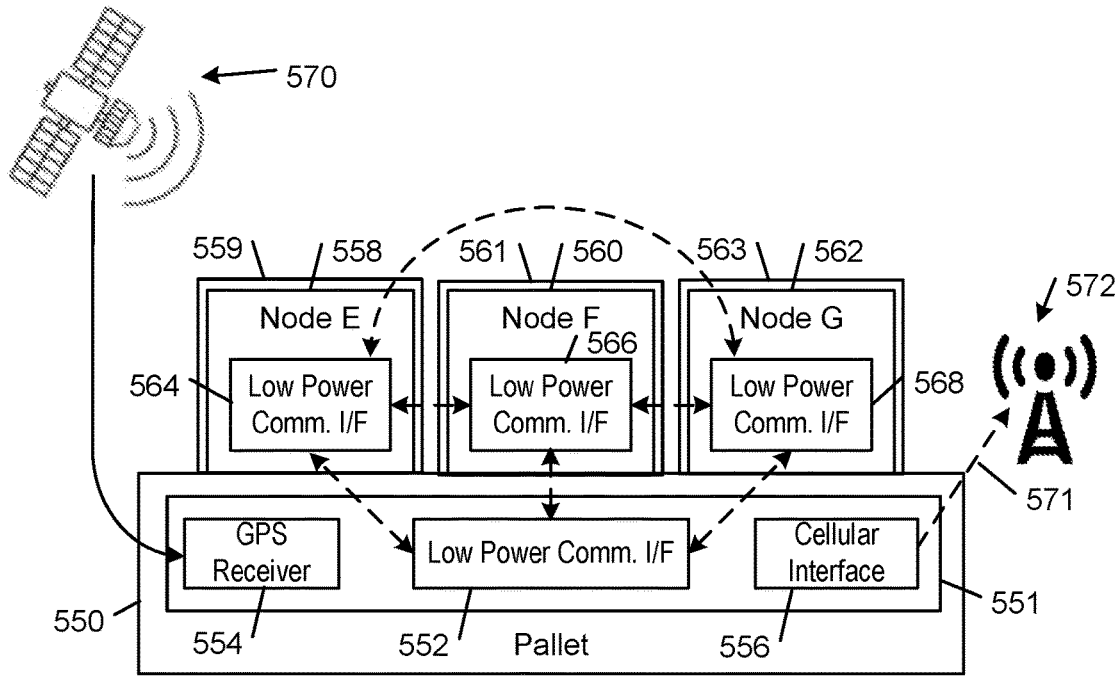

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
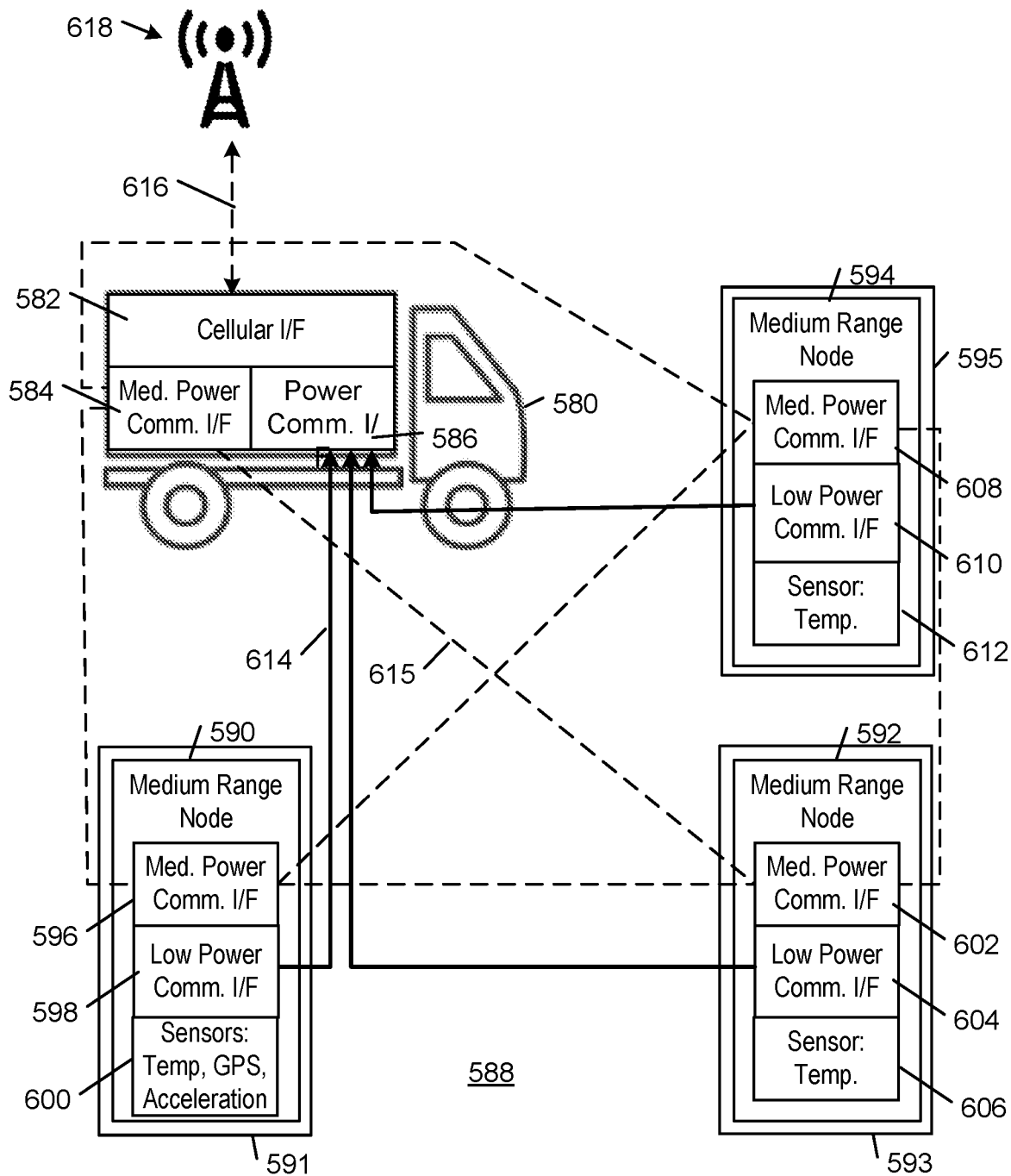

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
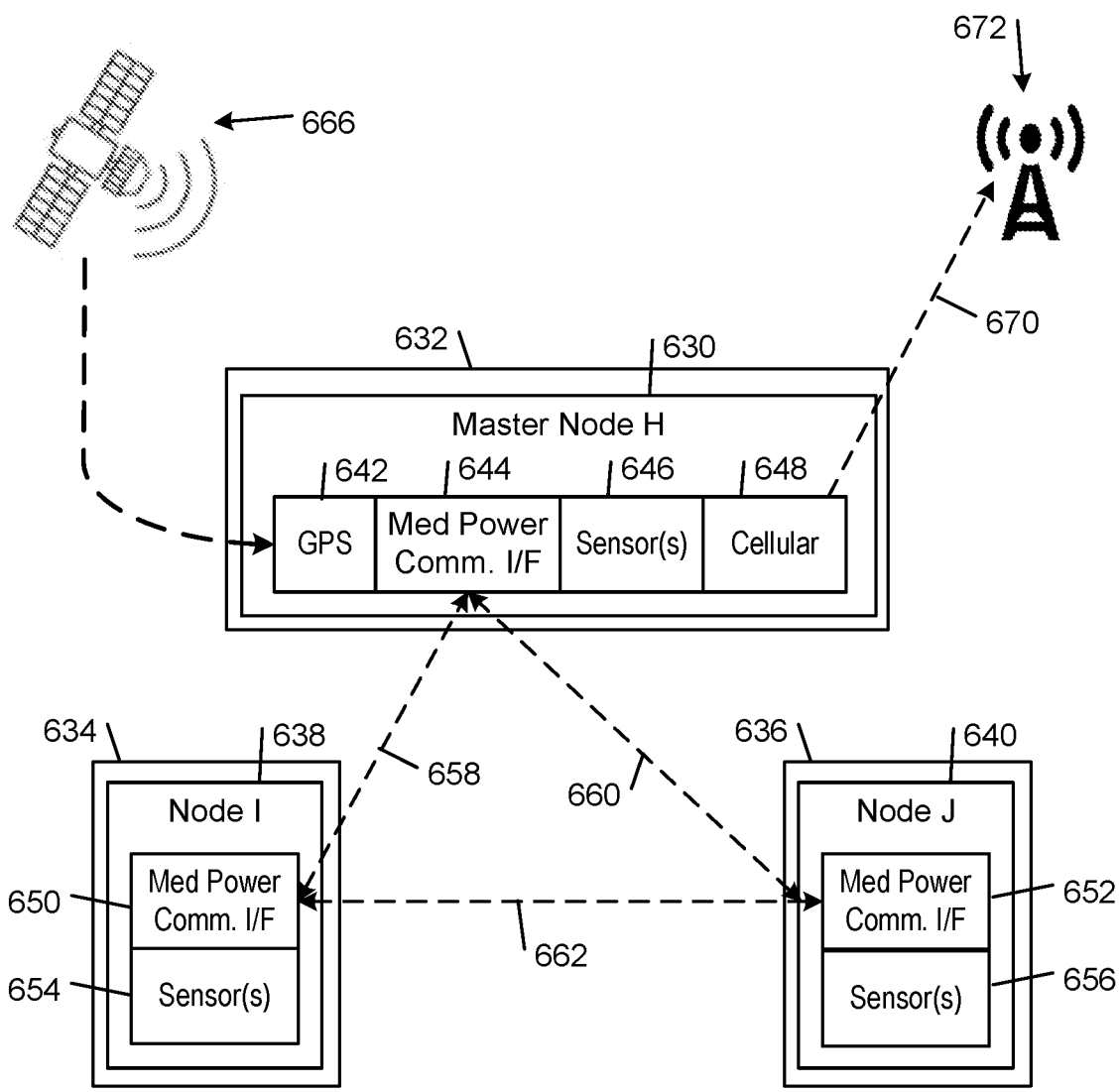

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Detecting Airwave Congestion and Preventing Gridlock

In systems having a large number of wireless nodes, open and continuous communications between the nodes can often cause airwave congestion, long latencies, and battery life concerns for nodes including a battery powered device. When airwave congestion occurs in a wireless network of devices, it is necessary to identify and address congestion quickly in order to prevent gridlock from occurring within the wireless network.

A wireless sensing system detects airwave congestion using one or more methods and performs one or more actions to reduce congestion and prevent gridlock. In an embodiment, methods for detecting airwave congestion may include one or more of: receiving information describing time of nodes and measured latencies for nodes of the system; measuring and analyzing usage of resources and communications within the system; identifying and circumventing heartbeat signals; identifying a number of executed handshakes vs expected handshakes within the system. In other embodiments, methods for detecting airwave congestion may include checking for cyclic redundancy check (CRC) failures as a proxy for airwave congestion. CRCs detect accidental changes to raw data using a check value associated with data being transmitted. The check value is, for example, a sequence of bits used to generate a hash. Responsive to data being transmitted, the sequence of bits is recalculated by a receiving entity and used to confirm that the received data (e.g., represented by the sequence of bits) is correct. CRC failures or CRC errors may be used to proxy airwave congestion, representing a likelihood that data is corrupted or lost during transfer between nodes of the system. In some embodiments, additional or different methods may be used to detect airwave congestion, and combinations of methods may be used in parallel, simultaneously, or sequentially. In some embodiments, alternative to or in addition to the CRC a checksum is used to determine errors in data communications in the wireless sensing system. Using detected errors from checksum comparison may also be used as a proxy to determine airwave congestion, similar to the CRC failures.

Responsive to the wireless sensing system detecting airwave congestion, the wireless sensing system determines one or more actions for preventing gridlock and reducing airwave congestion. For example, the wireless sensing system may reduce how frequently communications are performed, may increase lossy compression for transmitting communications or data, may instruct one or more nodes to enter modes requiring less communications (e.g., a hibernation or sleep mode, a low communications mode), or may transmit a busy signal to nodes of the wireless sensing system to decrease the airwave traffic. In another example, the wireless sensing system may use variable handshaking granularities to reduce airwave congestion, as discussed further in conjunction with FIGS. 12A-C.

Actions to identify leading indicators of airwave congestion and gridlock may be performed at various levels of the wireless sensing system. In an embodiment, an infrastructure of the wireless sensing system detects airwave congestion, determines one or more actions to prevent gridlock, and executes the one or more actions. In another embodiment, labels or nodes of the wireless sensing system may detect airwave congestion, determine one or more actions to prevent gridlock, and execute the one or more actions. In another embodiment, a cloud or server of the wireless sensing system may perform one or more computation steps (e.g., checking for CRC errors, receiving and comparing time of nodes and measured latencies for nodes of the wireless sensing system) and transmit a result or analysis of the computation to nodes of the wireless sensing system.

In an embodiment, the wireless sensing system distributes one or more computations, actions, and/or other responsibilities and functions to various nodes and entities of the wireless sensing system.

Figure 11:
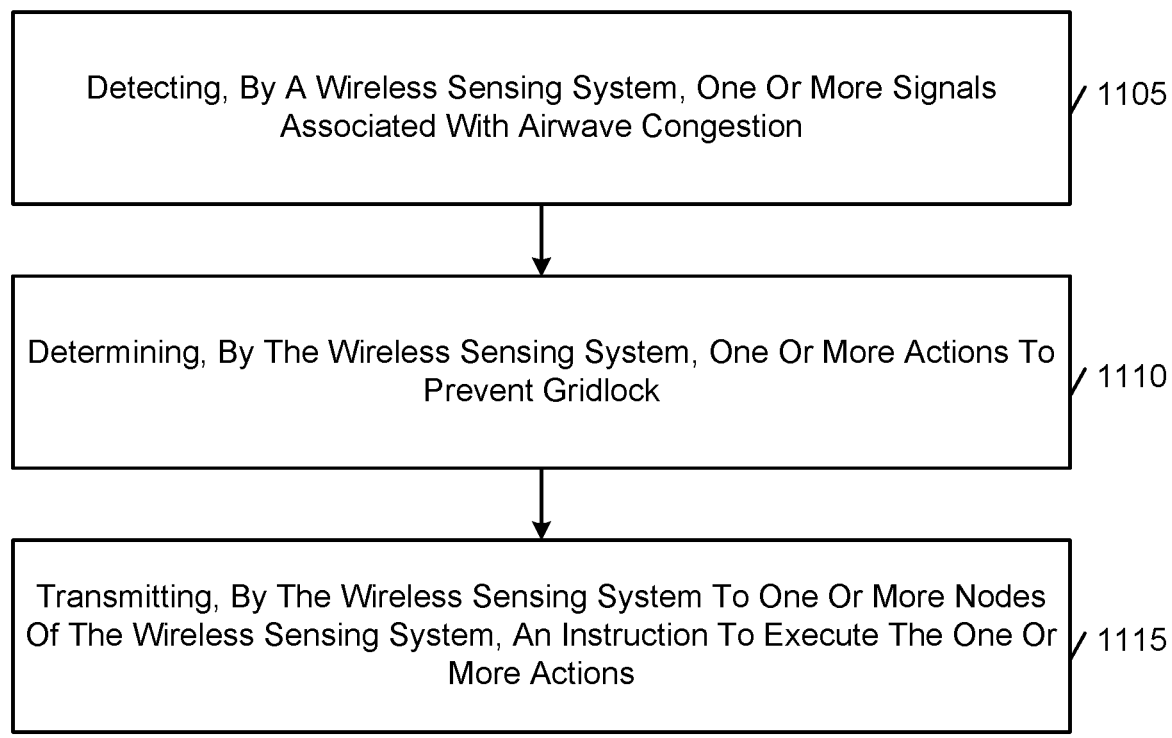
FIG. 11 is a flow diagram of a method of detecting airwave congestion and preventing gridlock in a wireless sensing system, according to some embodiments.

FIG. 11 is a flow diagram illustrating an example method for detecting airwave congestion. A wireless sensing system detects one or more signals associated with airwave congestion (FIG. 11, block 1105). For example, the one or more signals include time of nodes and measured latency of nodes of the wireless sensing system, a frequency or severity of CRC failures, and the use of heartbeat signals and handshaking protocols to establish and confirm communication channels. The wireless sensing system determines one or more actions to prevent gridlock and reduce airwave congestion (FIG. 11, block 1110). The wireless sensing system transmits an instruction to execute the one or more actions to respective nodes, servers, gateways, or other entities of the system (FIG. 11, block 1115).

In other embodiments, the method may include additional, fewer, or different steps, and the steps may be performed in different orders. In other embodiments, some or all of the steps may be performed by other entities of the wireless sensing system.

Using Variable Handshaking Granularities to Reduce Airwave Congestion

The wireless sensing system includes a plurality of nodes configured to execute one or more handshaking protocols at a group granularity. Nodes of the wireless sensing system are associated with a group identifier. Each group of nodes communicates with an infrastructure of the wireless sensing system via a handshaking protocol. Additional communications may be transmitted within each group of nodes, such that instructions, data, and other information may be received by any node of the wireless sensing system. As discussed previously, individual handshaking between nodes requires a large amount of time and power consumption as the number of nodes increases in a system and may cause airwave congestion, gridlock, and other problems due to large volume of airwave traffic to occur.

In an embodiment, group identifiers are assigned to nodes based on a media access control (MAC) address associated with nodes of the wireless sensing system. In other embodiments, the group identifiers are assigned to a node based on a different identifier of the node, such as a hardware identifier, a network identifier, a unique identifier, a software identifier, or some other type of identifier stored on the node and associated with the node. For example, nodes having MAC addresses ending in a first particular value or first set of values may be assigned to a first group, while nodes having MAC addresses ending in a second particular value or second set of values may be assigned to a second group, and so forth. In another example, the MAC address of each tape node is truncated or compressed into a compressed identifier. Naturally, aliasing will occur and some of the tape nodes will have the same compressed identifier. The grouping of the nodes may be based on the compressed identifier, with nodes having the same compressed identifier being assigned to the same group and being assigned the same group identifier. In another embodiment, group identifiers are assigned to nodes based on communication capabilities, sensors, functions, locations, or other elements of the nodes. For example, each node that includes a temperature sensor may be assigned a same group identifier.

Example techniques for compression of identifiers for the nodes is described in further detail in U.S. patent application Ser. No. 17/300,341, filed on May 14, 2021 and titled "OPTIMIZED CONTEXT-BASED COMMUNICATION COMPRESSION FOR IOT SYSTEMS AND NETWORKS," which is incorporated herein in its entirety.

In an embodiment, nodes of the wireless sensing system self-identify group identifiers and self-organize into groups of nodes. For example, each node of the wireless sensing system identifies a corresponding MAC address and identifies a corresponding group identifier based on the MAC address. In another embodiment, a gateway node of the wireless sensing system identifies and organizes nodes into groups of nodes. In further embodiments, the gateway node is an infrastructure node. The infrastructure node receives either the identifiers or the compressed identifiers and assigned group identifiers to the nodes based on the received identifiers or compressed identifiers. An infrastructure node is an embodiment of a stationary gateway node which includes at least a first type of wireless communication system for communicating with other nodes. The infrastructure node is incorporated into the infrastructure of an environment and typically has a fixed location, according to some embodiments. For example, the infrastructure node may be plugged into an electrical outlet or incorporated into an electrical line and receive electrical power from the electrical outlet or the electrical line. In some embodiments, an infrastructure node may be an embodiment of an adhesive tape platform. For example, the infrastructure node may be an adhesive tape platform that includes one or more energy harvesting components.

In other embodiments, group identifiers and groups of nodes may be used for additional or different communications purposes, e.g., measuring latencies, performances, and other data at group granularities; transmitting instructions, data, files, or the like to groups of nodes for distribution within the group; receiving collated data from groups of nodes; and the like.

The infrastructure nodes of the wireless sensing system selectively communicates with groups of nodes to transmit and receive data, instructions, and other information. For example, the infrastructure may confirm receipt of a communication from a node of a group of nodes, transmit an instruction for a node or group of nodes to enter a sleep mode, transmit an instruction for a node or a group of nodes to execute an action, perform a computation, or capture sensor data, and the like. In an example, the infrastructure confirms receipt of a communications (e.g., a receipt for successfully completing a handshaking protocol) from each of a subset of a plurality of nodes. In an example, the communications include the performing of a handshaking protocol. The subset of nodes having been confirmed as completing the handshaking protocol may enter a sleep mode, upon the instruction of the infrastructure node, for example. The other nodes of the plurality of nodes not in the subset which have not been confirmed as completing the handshaking protocol transmit an additional communication to the infrastructure to execute the handshaking protocol.

In an embodiment, responsive to the infrastructure confirming the handshaking protocol as having been completed by all nodes in a group of nodes, each node of the group of nodes is configured to enter a sleep mode. In an embodiment, each node of the group of nodes is further configured to wake up responsive to an event, e.g., an additional communication from the infrastructure or a signal transmitted by another entity of the wireless sensing system. A node in the sleep mode is configured to limit their wireless communications to conserve their battery and avoid congesting the airwaves in their environment. The sleep mode reduces unnecessary wireless communications, but may permit transmission of low-power transmissions, such as the periodic transmission of a heartbeat signal. A wireless node in the sleep node may be configured to still receive wireless communications that correspond to a wake signal. The wireless node, for example, may be configured to periodically activate a wireless communication system and check for an incoming wake signal while in the sleep mode. In response to receiving the wake signal, the wireless node may exit the sleep mode and increase one or more activities, functions, or communications, according to some embodiments.

A heartbeat signal of a node is a minimal data signal that the node transmits to indicate to the IOT system 400 that the node is functioning correctly. In some cases, the heartbeat signal also indicates that the node has not detected any anomalous events or conditions for an asset associated with the node. The heartbeat signal may be transmitted as a data packet that has a minimal size, which allows the node to check in with the IOT system 400 without unnecessarily consuming resources of the node and the IOT system, such as energy reserved in a battery of the node. The heartbeat signal may include an identifier associated with the node (e.g., a unique identifier, a hardware identifier, a MAC address, a software identifier, or some other identifier). The heartbeat signal may also include a flag which indicates a good or normal status of the node and optionally an associated asset. The node may transmit the heartbeat signal with a relatively low frequency, according to some embodiments. For example, the node may transmit the heartbeat signal to another node of the IOT system 400 once every hour or once every day. The IOT system 400 may be configured to detect that a status of a node is not normal, if the heartbeat signal is not received during a period of time. For example, if the IOT system 400 has not received a heartbeat signal from a node for a period of over 24 hours, the IOT system 400 may determine that the node is not functioning properly.

In an embodiment, one or more of the actions, computations, and other functions described herein may be performed by servers, clouds, gateways, or other nodes of the wireless sensing system. For example, a gateway node or black tape node may perform handshaking protocols with one or more groups of tape nodes of the wireless sensing system and communicate a confirmation of the handshaking protocols being completed to a server or cloud of the wireless sensing system. In another example, a gateway or black tape node may be included in at least one group of nodes and may behave as a master node of the group of nodes.

Figure 12A:
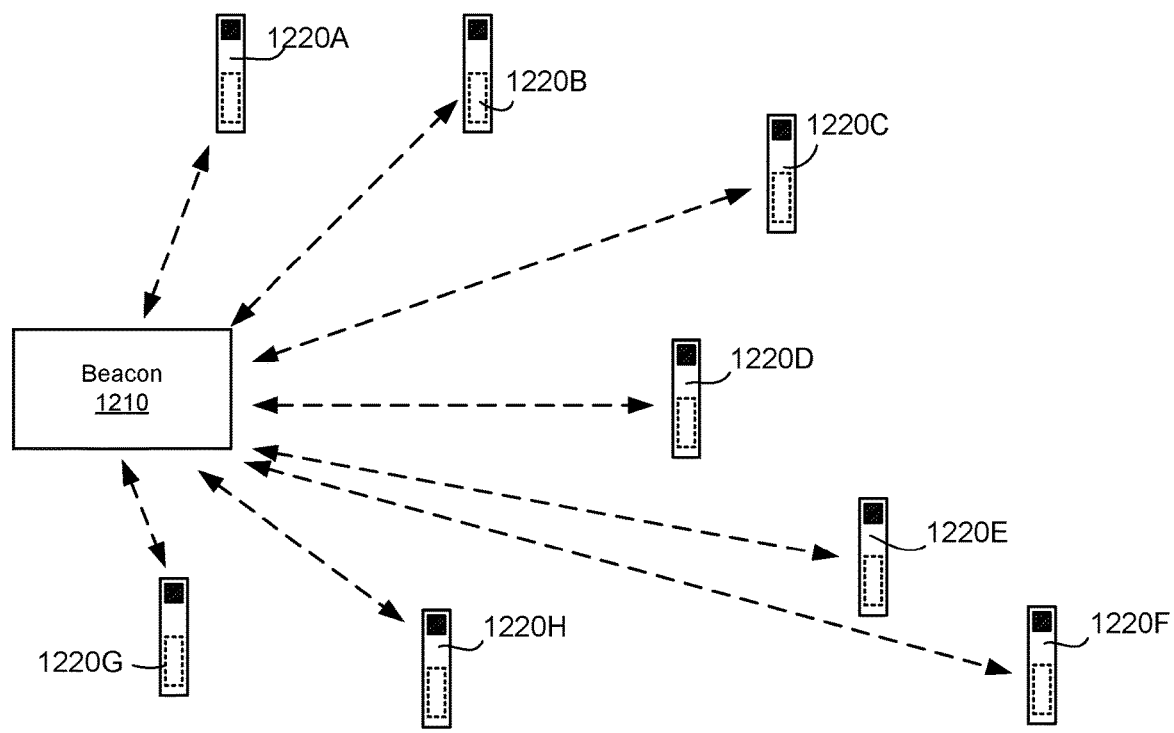
FIGS. 12A-12D are example illustrations of using variable handshaking granularities to reduce airwave congestion in a wireless sensing system, according to some embodiments.

FIG. 12A is an example illustration of conventional handshaking protocols executed by an infrastructure node 1210 of an internet of things (JOT) system. A beacon 1210 is a wireless node that is configured to communicate with each of the multiple wireless nodes 1220A-1220I (collectively referred to herein as wireless nodes 1220) in an environment 1201. The beacon 1210 may be an embodiment of a gateway node. In some embodiments, the beacon 1210 is plugged into an electrical outlet or is otherwise line-powered. The beacon 1210 attempts to complete individual handshaking protocols with each of a plurality of nodes 1220, in the conventional system. However, if the number of wireless nodes 1220 is large, situations where each of the wireless nodes 1220 attempt the handshaking protocol results in airwave congestion. As such, an individual wireless node, e.g., wireless node 1220A, attempting to perform the handshake with the beacon 1210 may suffer from wireless interference that is caused by the other wireless nodes. If the wireless nodes 1220 are battery-powered, this may cause issues with battery life, due to the significant power consumption that occurs during a lengthy, inefficient handshaking process. For example, if a high degree of wireless interference occurs in the environment 1201 due in part to a large number of wireless nodes 1220 present, each of the wireless nodes 1220 may need to transmit wireless signals at a high amplitude, more frequently, and over a longer period of time to complete the handshaking, resulting in high power consumption.

FIG. 12A shows 8 wireless nodes 1220 and a single beacon 1110 for illustrative purposes, but the environment 1201 may include a different number of wireless nodes 1220 and beacons 1110 wirelessly communicating. In many cases, a much larger number of nodes will be present, which results in significant wireless interference. The disclosed method and system thereof, illustrated in FIGS. 11 and 12A-12D, improves on the efficiency of the handshaking and communication process, which overall improves the performance of the network in many aspects, as the number of nodes in an environment increases.

Figure 12B:
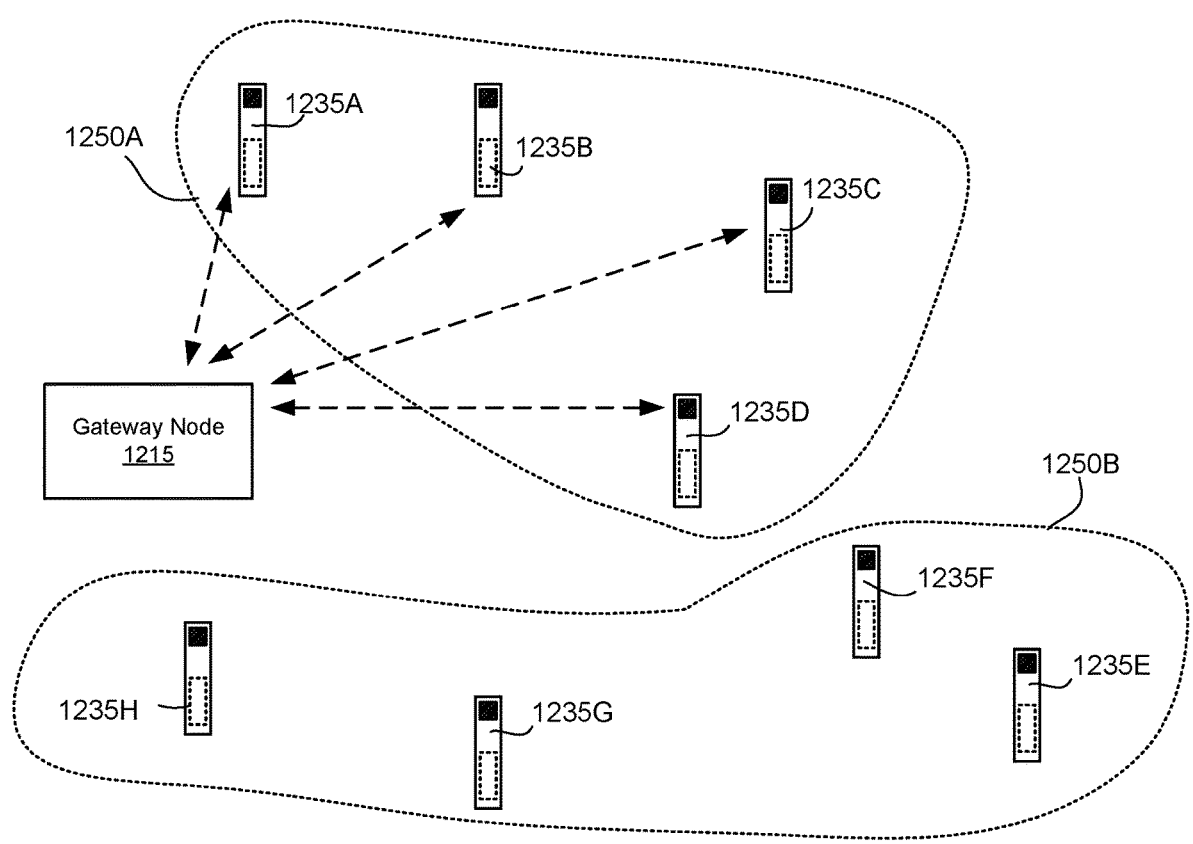

FIG. 12B is an example illustration of a gateway node 1210 of a wireless sensing system selectively completing handshaking protocols with a first group 1250A of wireless nodes out of a plurality of wireless nodes 1235A-1235H (collectively referred to as the "wireless nodes 1235," herein) in an environment 1202, according to the disclosed method and system thereof. The first group 1250A of wireless nodes includes the wireless nodes 1235A-1235D. Each wireless node of the first group 1250A includes a same first group identifier, which may be stored on a memory or storage of each of the wireless nodes of the first group 1250A. A second group 1250B of wireless nodes out of the plurality of wireless nodes 1235 is assigned a second group identifier. The second group 1250B of wireless nodes includes the wireless nodes 1235E-1235H. In some embodiments, the gateway node 1215 assigns a group identifier to each of the wireless nodes 1235. As discussed above, a group identifier may be assigned based on a unique identifier or compressed version of the unique identifier of a wireless node 1235. In other embodiments, each of the wireless nodes 1235 is configured to determine and assign themselves a group identifier. Alternatively, each of the wireless nodes 1235 is pre-programmed with a group identifier.

The gateway node may be an infrastructure node, in some embodiments. The gateway node is configured to wirelessly communicate with the wireless nodes and also communicate with a server of the IOT system 400, according to some embodiments. The gateway node may be a line-powered device or a battery powered device. In some embodiments, the gateway node is an embodiment of an adhesive tape platform. The gateway node may be a mobile gateway or a stationary gateway, according to some embodiments. Also, one or more of the wireless nodes 1235 may be an embodiment of a tape node or an adhesive tape platform. The wireless nodes 1235 may also be referred to herein, as "end nodes 1235".

The gateway node 1215 stores a list of group identifiers for addressing groups 1250A, 1250B of tape nodes. In some embodiments, the gateway node 1215 generates the list by scanning the environment for wireless nodes 1235 broadcasting their group identifier. For example, each wireless node 1235 may broadcast its respective group identifier to the gateway node 1215. The gateway node 1215 may receive the broadcasted group identifier and generate the list of group identifiers. In some embodiments, the gateway node 1215 retrieves the list of group identifiers from a database (e.g., database 408) storing group identifiers for wireless nodes of the IOT system 400. The gateway node 1215 then addresses a group of wireless nodes by addressing all wireless nodes 1235 in the environment 1202 that have a corresponding group identifier.

The gateway node 1215 selectively initiates a handshaking protocol with wireless nodes in the first group 1250A. In some embodiments, a gateway-led configuration is used, in which the gateway node 1215 instructs all other wireless nodes not in the first group 1250A to enter the sleep mode, in order to reduce the airwave traffic during the handshake process with the nodes of the first group 1250A. The gateway node 1215 may instruct all wireless nodes not in the first group 1250A to temporarily cease attempts at performing a handshaking protocol with the gateway node 1215, until the gateway node 1215 is finished performing the handshake protocol with the first group 1250A. During the handshaking protocols with wireless nodes of the first group 1250A, no handshaking protocols are executed with wireless nodes of the second group 1250B.

In other embodiments, an end node-led configuration is used, in which the wireless nodes collectively and/or individually determine which group 1250A, 1250B of wireless nodes will initiate the handshake process with the gateway node 1215, without being instructed by the gateway node 1215. Each of the wireless nodes may each determine when to perform the handshake protocol, based on a respective group identifier of the wireless node. For example, each of the wireless nodes 1235 may store a schedule for when to perform handshake protocols, the schedule based on the group identifier of the respective wireless node 1235. In another example, the wireless nodes of the first group 1250A are pre-programmed to initiate their handshake protocols first based on having the first group identifier. Each of the wireless nodes of the second group 1250B are pre-programmed not to initiate its handshake protocol until a signal is received that indicates that the first group 1250A are finished with their handshake protocol. In the end-node led configuration, the gateway node 1215 may be configured to perform the handshake protocol with any of the wireless nodes 1235 that attempt to initiate the handshake protocol. In this case, the wireless nodes 1235 themselves sort out which of the wireless nodes 1235 will initiate the handshake protocol with the gateway node 1215, without needing the gateway node 1215 to address the wireless nodes by group identifier.

In some embodiments, the second group 1250B enters the sleep mode temporarily while the first group 1250A is performing the handshake protocol with the gateway 1210. The second group 1250B may be preprogrammed with a duration to stay in the sleep mode. In some embodiments, the second group 1250B detects that the first group 1250A is performing the handshake protocol with the gateway 1210, and temporarily enters the sleep mode in response, without receiving instruction from the gateway node 1215. Similarly, the second group 1250B may detect when the first group 1250B is finished with the handshake protocol and wake from the sleep mode, in response. The second group 1250B may detect the state of the handshake protocol with the first group 1250A, based on wireless communications received from either the gateway node 1215 or one or more of the wireless nodes of the first group 1250A.

Figure 12C:
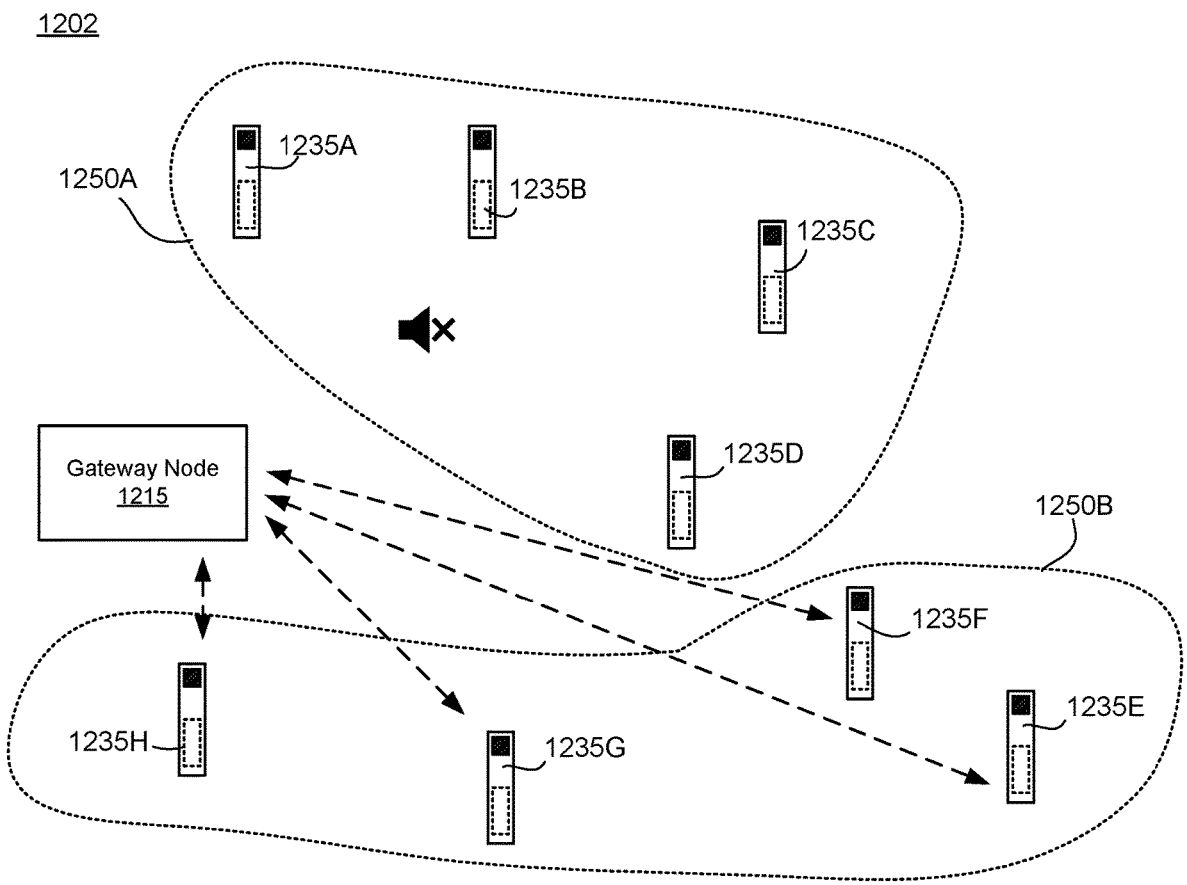

FIG. 12C is an example illustration of the environment 1202 in which the wireless nodes of the first group 1250A cease communications with the gateway node 1215, in response to completing the handshake protocol with the gateway node 1215. Simultaneously or subsequently, each of the wireless nodes of the second group 1250B perform a respective handshaking protocol with the gateway node 1215. Since the first group 1250A has already completed the handshaking protocol, the wireless nodes of the first group 1250A reduce their wireless communications to alleviate airwave congestion in the environment 1202. This allows for the second group 1250B to complete their handshake protocol with the gateway node 1215 with higher efficiency and a lower probability of communication error.

As discussed above, coordination of the communication and handshake protocols for the groups 1250A, 1250B may be gateway node-led or end node-led, according to some embodiments. In the gateway node-led configuration, the gateway node 1215 instructs the wireless nodes of the first group 1250A to reduce their communications or enter the sleep mode, prior to initiating the handshake protocol with the second group 1250B. The gateway node 1215 then addresses the wireless nodes of the second group 1250B using the corresponding second group identifier to initiate the handshake protocol with the second group 1250B. The gateway node 1215 may send a signal that is received by the wireless nodes of the second group 1250B which wakes the wireless nodes of the second group 1250B, for example.

In the end node-led configuration, the wireless nodes of the first group 1250A automatically reduce their wireless communications or enter the sleep mode in response to completing the handshake protocol with the gateway node 1215. The wireless nodes of the second group 1250B may then wake from the sleep mode or increase their wireless communication activity. The wireless nodes of the second group 1250B initiate their respective handshake protocols with the gateway node 1215 until, all of the wireless nodes 1235 have finished the handshake protocol with the gateway node 1215.

After the handshake protocol with the gateway node 1215 is finished for all of the wireless nodes 1235 of the environment 1202, the wireless nodes 1235 may enter a sleep mode until the IOT system 400 detects that an event has occurred that requires one or more of the wireless nodes 1235 to alter their own state. The wireless nodes may operate according to a distributed intelligent software, in which the intelligence for detecting events, altering states of the tape nodes, and performing computations are distributed through various nodes of the IOT system 400. The distributed intelligent software is discussed in further detail in U.S. patent application Ser. No. 17/448,346, filed on Sep. 21, 2021, titled "DISTRIBUTED INTELLIGENT SOFTWARE FOR INDUSTRIAL IOT," which is incorporated herein in its entirety.

In some cases, it may be necessary for a wireless node other than the gateway node 1215 in the environment 1202 to perform handshake protocols with the wireless nodes 1235. For example, the wireless node may need to discover the available wireless nodes 1235 in the environment 1202 in order to complete a task or deliver data to one or more of the wireless nodes 1235. The same disadvantages of airwave congestion and inefficiency arise, if all of the wireless nodes 1235 attempt to perform the handshake protocol with the wireless node at the same time. FIG. 0.12D is an example illustration of a wireless node 1260 selectively completing a handshake protocol with the first group 1250A of wireless nodes using the disclosed method and system thereof, according to some embodiments.

Similar to the method that is used for selectively performing the handshake protocol with the gateway node 1215, the first group 1250A of wireless nodes perform a handshake protocol with the wireless node 1260, while the second group 1250B of wireless nodes reduce their wireless communication or enter a sleep mode. After the first group 1250A of wireless nodes finish their respective handshake protocols, the first group 1250A reduces their wireless communications or enter the sleep mode. Subsequently the wireless nodes second group 1250B wake from the sleep mode or increase their wireless communication activity, initiating respective handshake protocols with the wireless node 1260. The coordination of the groups 1250A, 1250B and the selective handshake protocols may be gateway node-led or end node-led, according to some embodiments.

In the gateway node-led configuration, the gateway node addresses each of the wireless nodes in a respective group 1250A, 1250B to instruct that group to perform the selective handshake protocol for that group with the wireless node 1260. The gateway node may also address a group 1250A, 1250B, instructing the respective group to enter the sleep mode or reduce wireless communications while another group performs the handshake protocol. The gateway node may have completed a handshake protocol with the wireless node 1260. The gateway node may instruct a group 1250A, 1250B to selectively perform handshake protocols only with the wireless node 1260 by specifying an identifier associated with the wireless node 1260. In other embodiments, the gateway node may instruct a group 1250A, 1250B to perform handshake protocols with another group of wireless nodes, the other group possibly including the wireless node 1260. The gateway node may sequentially instruct pairs of groups to perform the handshake protocols, until all of the wireless nodes 1235 have completed the handshake protocol with the wireless node 1260, according to some embodiments.

In the end node-led configuration, the wireless nodes 1235 coordinate to perform the handshake protocols group by group, without requiring instruction or communication with the gateway node 1215. In this case, the gateway node may still transmit an instruction or notification that a wireless node, e.g., wireless node 1260, needs to perform handshake protocols with the wireless nodes 1235 to initiate the process. In other embodiments, the wireless nodes 1235 initiate the selective handshake protocols for the groups 1250A, 1250B in response to receiving a request from the wireless node 1260.

Once all of the wireless nodes 1235 have completed handshake protocols with the wireless node 1260, the wireless node 1260 may take further action. The further action may include communicating data with one or more of the wireless nodes 1235. In some embodiments, all of the wireless nodes 1235 enter the sleep mode until the IOT system 400 detects an event that requires one or more of the wireless nodes 1235 to alter their state.

Outside of the handshake protocol, each group 1250A, 1250B may alter the state of the wireless nodes in the respective group in order to perform functions and tasks for the IOT system 400. For example, if the wireless node 1260 needs to communicate with a wireless node 1235C of the first group 1250A, the wireless nodes of the second group 1250B may enter the sleep mode for a period of time during which the wireless node 1260 wirelessly communicates with the wireless node 1235C. Thus, by disabling or reducing wireless communications for a group 1250B of wireless nodes, the second group 1250B assists the wireless node 1260 and the wireless node 1235C by reducing the possibility of wireless interference hindering the wireless communication between the wireless node 1260 and the wireless node 1235C.

In some embodiments, the IOT system 400 may assign tasks to one of the groups 1250A, 1250B. For example, the IOT system 400 may assign a computational task to the second group 1250B. The gateway node 1215 may communicate the instructions for the task to each of the wireless nodes in the second group 1250B by addressing the wireless nodes with the second group identifier. The wireless nodes of the second group 1250B may coordinate amongst each other to delegate portions of the task to one or more nodes of the second group 1250B.

As disclosed herein, the IOT system 400 may change settings of wireless nodes in a group 1250A, 1250B by addressing all of the wireless nodes in the environment 1202 that include the group identifier for the corresponding group 1250A, 1250B. The settings may include parameters for compression of data being wirelessly communicated, how frequently the wireless nodes perform wireless communications, a duration of time during which the wireless nodes perform wireless communications, a duration of time during which the wireless nodes enter the sleep mode, a schedule for entering the sleep mode, an alteration of a state of the wireless nodes, a selected channel for wireless communications, a bitrate, a type of wireless communication protocol to be used, other settings, or some combination thereof.

Figure 12D:
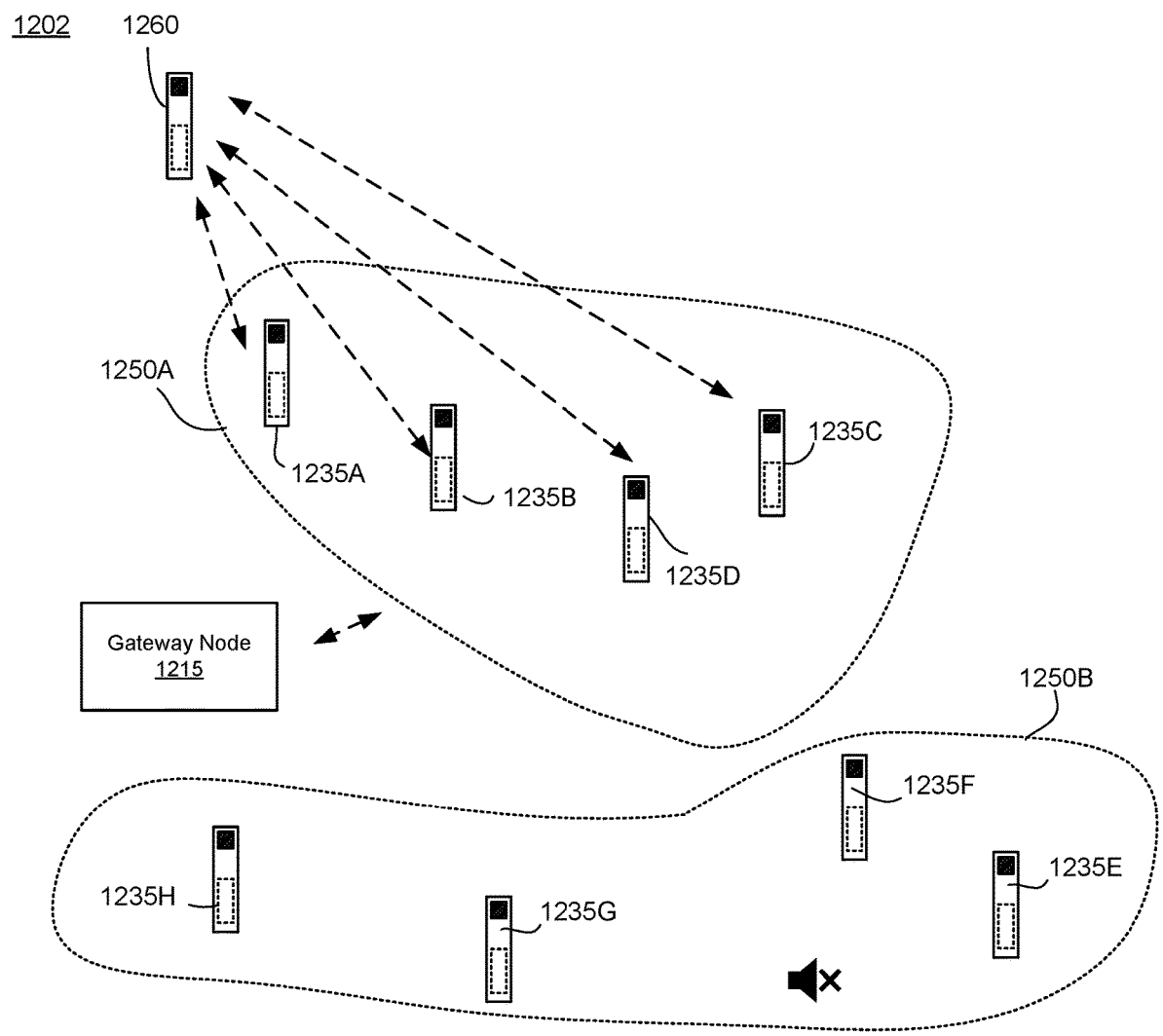

The number of wireless nodes 1235, groups 1250A, 1250B, and gateway nodes 1210 in FIGS. 12B-12D are for illustrative purposes, and the environment 1202 may include additional, fewer, or different number of wireless nodes 1235, types of wireless nodes, gateway nodes 1210, and groups 1250, according to some embodiments.

Configuring Groups of Wireless Nodes Using Infrastructure Node

In the examples of FIGS. 12B-12D, the configuration of the wireless nodes 1235 may be performed using a gateway node-led method or an end node-led method.

In the gateway node-led method, a gateway node (e.g., gateway device or tape node that is associated with the infrastructure of a system/location) detects conditions and/or events associated with the infrastructure, and in response, determines a configuration for wireless nodes 1235 or groups 1250A, 1250B of wireless nodes that it is can wirelessly communicate with. Detected conditions of the infrastructure may be based on data that indicates a type of the environment 1202 (e.g., a room), a location of the wireless nodes 1235, or the current time, for example. The gateway node 1215 wirelessly transmits to the wireless nodes 1235 instructions and/or programming for configuring the wireless nodes. The gateway node 1215 may broadcast these instructions generally to all wireless nodes 1235 that it is communicating with, according to some embodiments. In other embodiments, the gateway node 1215 may broadcast to all wireless nodes in the environment that have an association with the gateway node 1215. The association may be a predetermined association that is stored on the storage of the gateway node 1215 and/or the associated wireless nodes. Alternatively, the gateway node 1215 may broadcast to a group 1250A, 1250B of wireless nodes by addressing wireless nodes that include corresponding group identifier.

In the end node-led configuration the gateway node 1215 merely transmits data on the conditions and/or events associated with the environment 1202 to one or more of the wireless nodes 1235 in the environment 1202. Each of the wireless nodes 1235 then locally determines its own configuration settings, based on the received data from the gateway node 1215. The wireless nodes 1235 node may be pre-programmed with software, logic, and settings (e.g., the distributed intelligent software) for performing the end node-led configuration based on the data received from the gateway node 1215. For example, the gateway node 1215 may simply report a detected level of airwave congestion or a number of wireless nodes broadcasting on a channel for wireless communication to the wireless nodes 1235. The wireless nodes of the first group 1250A may respond by entering the sleep mode temporarily to allow for the wireless nodes 1250B to complete one or more tasks or functions, during the time when the first group 1250A is in the sleep mode, for example. A wireless node may base the configuration on some combination of received data, and data stored locally on the tape node (e.g. an identifier of the tape node, a manifest of resources on the tape node, other data, or some combination thereof)

In the case where gridlock or airwave congestion is a concern for the efficient operation of the wireless nodes 1235, the gateway node 1215 identifies that there is gridlock on the airwaves (i.e., excessive traffic in one or more wireless communication channels). In the gateway node-led configuration, the gateway node 1215 detects the gridlock or airwave congestion and instructs groups 1250A, 1250B of wireless nodes or individual wireless nodes to alter their operation to reduce the problem of gridlock.

In a situation where a high level of wireless interference (e.g., interference from electromagnetic field disturbances, the wireless nodes may change their configuration to perform wireless communication transmissions with higher amplitude to overcome the interference and ensure that wireless communications are correctly received without errors. In other examples, one or more of the wireless nodes may be configured by the gateway node 1215 or configure themselves to reduce amplitude of wireless transmissions to reduce a level of overall signal noise in the environment 1202. This may be in response to the gateway node detecting an above threshold level of signal noise, for example.

If the environment 1202 is one where the wireless nodes' 1235 functionality won't be used, the gateway node may instruct wireless nodes or the wireless nodes may configure themselves to enter a sleep mode, a hibernation mode, or deactivate to conserve battery of the wireless nodes. For example, the environment may be a storage room, where the wireless nodes' functionality won't be used Different methods may be used to assign group identifier to groups 1250A, 1250B of wireless nodes. In some embodiments, the group identifier for a wireless node is based on a unique identifier (e.g., MAC address) for the wireless node. The group identifier may be a compressed or truncated version of the unique identifier. For example, the group identifier for a wireless node may be the unique identifier of the wireless node truncated to the last 0 bits (in order to address all tapes in the environment 1202), 2 bits, 4 bits, or 2 bytes. In an example, if a group identifier for a wireless node is the unique identifier truncated to the last 4 bits, there will be 16 possible group identifiers for the wireless nodes 1235.

Computer Apparatus

Figure 13:
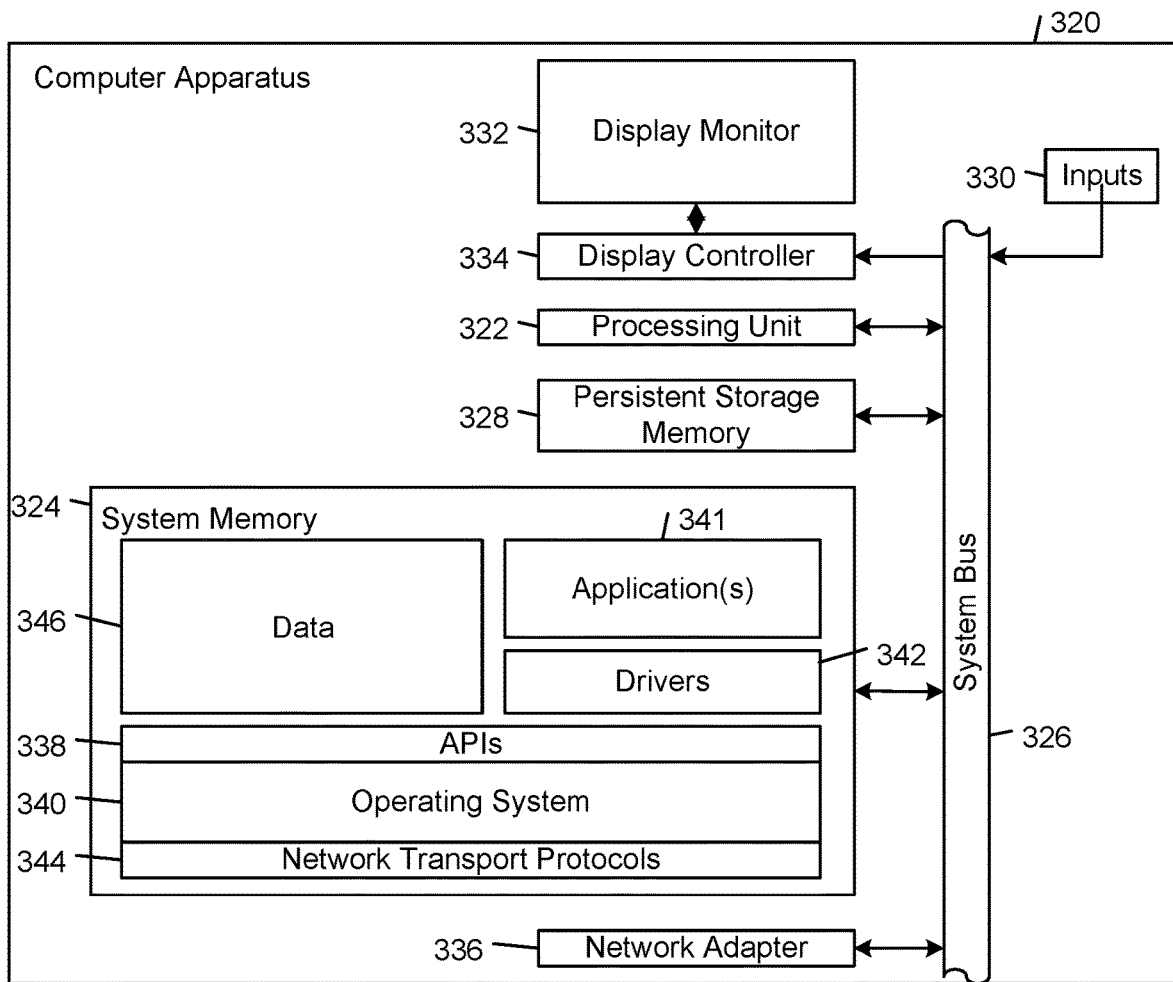
FIG. 13 shows an example embodiment of computer apparatus, according to some embodiments.

FIG. 13 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wireless sensing system comprising:
 a gateway node configured to wirelessly communicate with a plurality of wireless nodes in an environment; and
 a first set of the plurality of wireless nodes, each wireless node of the first set configured to wirelessly communicate with the gateway node and to wirelessly communicate with other wireless nodes of the plurality of wireless nodes, each wireless node of the first set comprising a same first group identifier, wherein
 the gateway node is configured to address the first set of the plurality of the wireless nodes by addressing all wireless nodes in the environment that broadcast the first group identifier.

2. The wireless sensing system of claim 1, further comprising:

a second set of the plurality of wireless nodes, each wireless node of the second set configured to wirelessly communicate with the gateway node and to wirelessly communicate, each wireless node of the second set comprising a same second group identifier.

3. The system of claim 2, wherein each wireless node of the second set is configured to perform steps comprising:
receiving a first communication from the gateway node;
performing a handshake protocol with the gateway node; and
transmitting a second communication to the gateway node, the second communication confirming completion of the handshake protocol with the gateway node.

4. The system of claim 3, wherein each wireless node of the first set reduces a wireless activity level while the wireless nodes of the second set are performing the handshake protocol with the gateway node.

5. The system of claim 3, wherein each wireless node of the first set temporarily enters a sleep mode while the wireless nodes of the second set are performing the handshake protocol with the gateway node.

6. The system of claim 5, wherein each wireless node of the first set exits the sleep mode in response to the wireless nodes of the second set completing the handshake protocol with the gateway.

7. The system of claim 1, wherein each wireless node of the first set is configured to perform steps comprising:
receiving a first communication from the gateway node;
performing a handshake protocol with the gateway node;
transmitting a second communication to the gateway node, the second communication confirming completion of the handshake protocol with the gateway node.

8. The system of claim 1, wherein based on a received communication from the gateway node, each of the wireless nodes in the first set generates or receives one of: an instruction to pause communications; an instruction to execute a handshaking protocol; an instruction to execute an action; an instruction to transmit information; an instruction to capture and transmit sensor data; an instruction to initiate communications; an instruction to modify a means of communication; and an instruction to enter a sleep mode.

9. The system of claim 1, wherein each wireless node's group identifier is based on a unique identifier of the wireless node.

10. The system of claim 9, wherein each wireless node's group identifier is based on a compressed or truncated version of the unique identifier of the wireless node.

11. The system of claim 1, wherein the gateway node is configured to:
receives one or more signals associated with airwave congestion from one or more wireless nodes of the plurality of wireless nodes;
determines one or more actions to prevent gridlock; and
transmits to one or more wireless nodes of the first set, an instruction to execute the one or more actions.

12. The system of claim 11, wherein the one or more signals comprise one or more of: A frequency and severity of cyclic redundancy check (CRC) failures; latency times of nodes of the wireless sensing system; and heartbeat signals of entities of the wireless sensing system; handshaking signals of entities of the wireless sensing system.

13. The system of claim 11, wherein the one or more actions to prevent gridlock comprise one or more of: reducing communication frequencies; increasing lossy compression; entering hibernation or sleep mode; setting a busy signal; and grouping nodes into communications groups to reduce overall communications in the system.

14. A method comprising:
detecting, by a wireless sensing system, one or more signals associated with airwave congestion;
determining, by the wireless sensing system, one or more actions to prevent gridlock; and
transmitting, by the wireless sensing system to one or more wireless nodes of the wireless sensing system, an instruction to execute the one or more actions.

15. The method of claim 14, wherein the one or more signals comprise one or more of: A frequency and severity of cyclic redundancy check (CRC) failures; latency times of nodes of the wireless sensing system; heartbeat signals of entities of the wireless sensing system; and handshaking signals of entities of the wireless sensing system.

16. The method of claim 14, wherein the one or more actions to prevent gridlock comprise one or more of: reducing communication frequencies; increasing lossy compression; entering hibernation or sleep mode; setting a busy signal; and grouping nodes into communications groups to reduce overall communications in the system.

17. A method comprising:
communicating, by a gateway node with a plurality of wireless nodes deployed in an environment, wherein each wireless node of the plurality of wireless nodes comprises a group identifier;
receiving, by the gateway node, a respective group identifier broadcasted from each of the plurality of wireless nodes; and
addressing, by a gateway node, a first set of wireless nodes of the plurality of wireless nodes, by addressing all wireless nodes in the environment that broadcast a first group identifier, wherein each wireless node of the first set comprises the same first group identifier and is configured to wireless communicate with the gateway node and with other wireless nodes.

18. The method of claim 17, further comprising:
addressing, by the gateway node, a second set of wireless nodes of the plurality of wireless nodes, by addressing all wireless nodes in the environment that broadcast a second group identifier, wherein each wireless node of the second set comprises the second group identifier.

19. The method of claim 18, wherein each wireless node of the first set reduces a wireless activity level while the wireless nodes of the second set are performing a handshake protocol with the gateway node.

20. The method of claim 17, further comprising:
receiving, by a wireless node of the first set, a first communication from the gateway node;
performing, by the wireless node of the first set, a handshake protocol with the gateway node; and
transmitting, by the wireless node of the first set, a second communication to the gateway node, the second communication confirming completion of the handshake protocol with the gateway node.

* * * * *